United States Patent [19]

Smith, Jr. et al.

[11] 4,291,249

[45] Sep. 22, 1981

[54] ROTATING ELECTRIC MACHINE WITH FLUID SUPPORTED PARTS

[75] Inventors: Joseph L. Smith, Jr., Concord; James L. Kirtley, Jr., Brookline, both of Mass.

[73] Assignee: Massachusetts Institute of Technology, Cambridge, Mass.

[21] Appl. No.: 27,344

[22] Filed: Apr. 5, 1979

[51] Int. Cl.³ .............................................. H02K 3/48
[52] U.S. Cl. ...................................... 310/214; 310/51; 310/52; 310/179; 310/258
[58] Field of Search ....................... 310/10, 40, 52, 64, 310/65, 51, 164, 180, 260, 184, 216, 198, 254, 258, 259, 214, 53, 91, 54, 194, 179; 336/100; 324/151, 154

[56] References Cited

U.S. PATENT DOCUMENTS

| | | | |
|---|---|---|---|
| 3,368,087 | 2/1968 | Madsen | 310/10 |
| 3,521,091 | 7/1970 | Halas | 310/10 |
| 3,681,628 | 8/1972 | Krastchew | 310/52 |
| 3,708,705 | 1/1973 | Tinlin | 310/52 |
| 3,743,875 | 7/1973 | Smith, Jr. | 310/198 |
| 3,772,543 | 11/1973 | Woodson | 310/52 |
| 3,991,333 | 11/1976 | Laskaris | 310/52 |
| 4,087,711 | 5/1978 | Kirtley | 310/10 |

OTHER PUBLICATIONS

"Demonstration of an Advanced Superconducting Generator", 6/10/77, M.I.T., E(49-18)-2295-T.O. 11-IR2.

"Demonstration of an Advanced Superconducting Generator", 1/31/77, M.I.T., E(49-18)-2295-T.O. 11-IR1.

*Primary Examiner*—R. Skudy
*Attorney, Agent, or Firm*—Arthur A. Smith, Jr.

[57] ABSTRACT

A rotating electric machine in which the armature winding thereof and other parts are supported by a liquid to withstand the mechanical stresses applied during transient overloads and the like. In particular, a narrow gap is provided between the armature winding and the stator which supports it and this gap is filled with an externally pressurized viscous liquid. The liquid is externally pressurized sufficiently to balance the static loads on the armature winding. Transient mechanical loads which deform the armature winding alter the gap dimensions and thereby additionally pressurize the viscous liquid to oppose the armature winding deformation and more nearly uniformly to distribute the resulting mechanical stresses.

14 Claims, 10 Drawing Figures

WALL BOUNDARY AND STREAMLINES

ROTATING ELECTRIC MACHINE WITH FLUID SUPPORTED PARTS

The Government has rights in this invention pursuant to Contract No. E(49-18)-2295 awarded by the Department of Energy.

The present invention relates to rotating electric machines.

Attention is called to two reports entitled "Demonstration of an Advanced Superconducting Generator," IR1 and IR2, which include a number of developments one of which is the present invention, and to the Mechanical Engineers' Handbook (1954), pp. 979–980.

As rotating electric machines become larger and larger, the problems of protecting such machines against mechanical stresses occasioned by normal machine forces, transients and like conditions, grow. In such large machines, the armature windings (and other elements) are subject to large magnetic forces of a pulsating nature during normal operation. The peak value of the force on a winding bar is several times the average force. In addition, electrical faults can impose forces on the bars that are many times normal operating levels, but that last for only a short time. The problem of accommodating the large forces encountered is particularly imposing in superconducting machines wherein, usually, the rotor is superconducting and small, but the stator parts operate at normal temperatures and are sized accordingly. Thus, while superconducting technology permits size minimization of the rotor parts of such machines, the stator parts do not scale down with the same significant decreases. The superconducting rotor can produce a very large magnetomotive force which can result in an increase in magnetic flux density and a reduction of ferromagnetic iron in magnetic flux circuits. Both of these effects serve to increase the magnetic forces imposed on armature conductor bars. Hence, the drive to larger machines opened by superconducting technology demands changes in the stator structures to accommodate the mechanical stresses thereby imposed on the machines.

It is an object of the present invention to provide a novel mechanicm for supporting the armature winding (or at least portions thereof) of a rotating electric machine.

Another object is to provide an armature winding supporting arrangement which distributes stresses on the winding to the stator core and/or stator frame of the machine.

Still another object is to provide armature winding support which will support armature conductors (e.g. bars) against large vibratory forces, provide damping of conductor vibrations, allow for thermal expansion of the conductors relative to a support structure, be compatible with conductor insulation, distribute the forces substantially uniformaly over the conductor, and restrain conductors against very large impulsive forces.

These and still further objects are addressed hereinafter.

The foregoing objects are achieved, generally, in a rotating electric machine having a rotor and a stator, wherein a narrow gap is provided between at least portions of the armature winding of the machine and other stator elements, that is, the stator frame and/or the stator core, to receive a viscous liquid. Further, the viscous liquid may be continually fed under pressure through the gap through appropriate dimensional ports to effect steady-state support of the portions of the winding adjacent thereto. The length and width dimensions of the gap are much larger than the thickness dimension thereof. The viscosity of the liquid and gap thickness are chosen so that the liquid is further pressurized at local locations, in the course of machine operation, by virtue of relative motion that changes the gap thickness, the gap being maintained with a non-zero thickness by liquid pressure at all times at said local locations and at other locations of the gap during transient and steady state loading; that is, the thickness dimension of the gap is not reduced to zero during operation of the machine because of forces within the machine of any nature.

The invention is hereinafter described with reference to the accompanying drawing in which.

Figure 1:
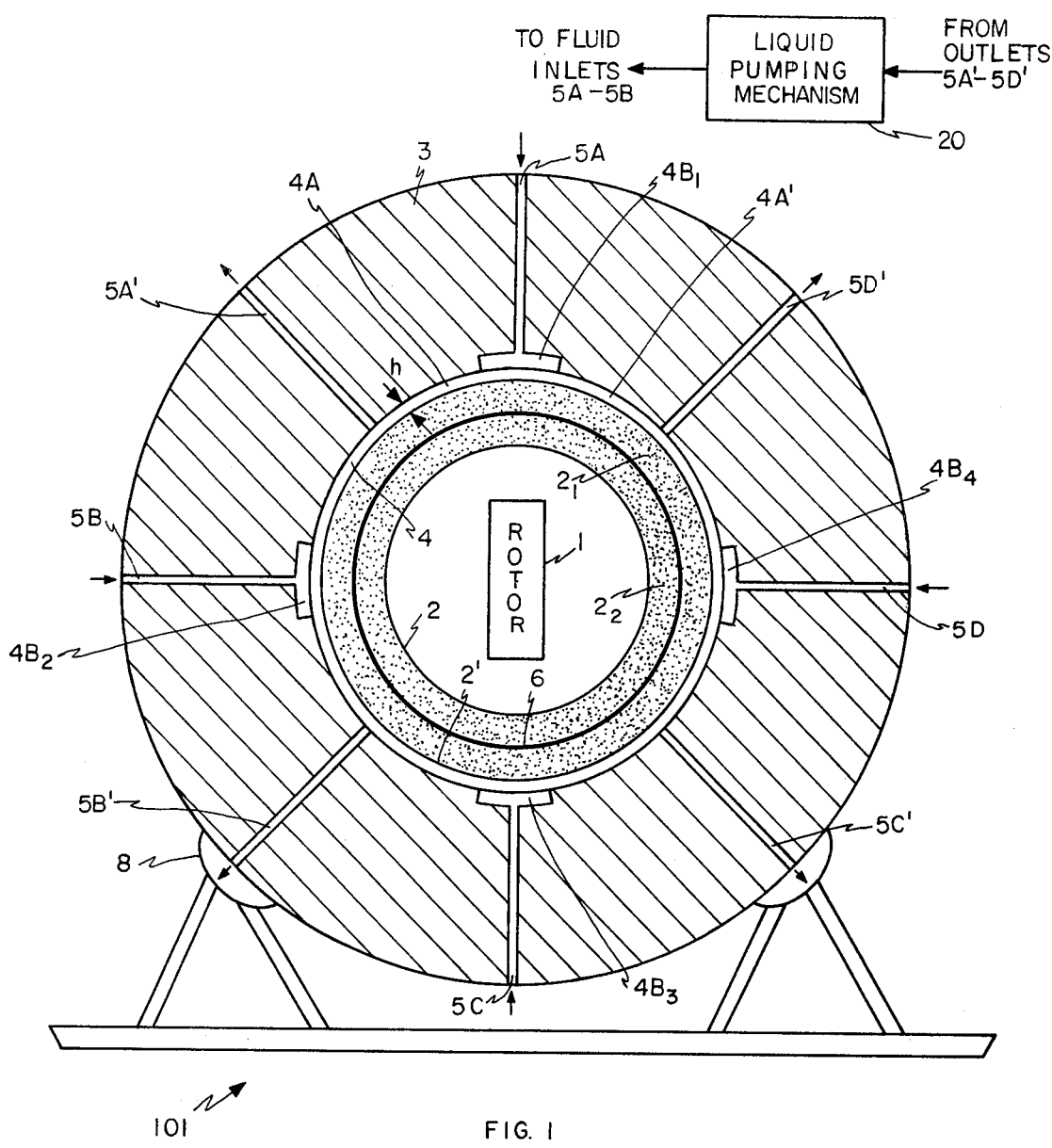
FIG. 1 is a front, elevation, section view in diagrammatic form of a rotating electric machine to show some general aspects of one form that the present inventive concepts can take.

Before proceeding with a detailed explanantion of the invention, it may be helpful to make comments of a general nature. The principle of this invention is that of fluid suspension. Basically, a fluid (such as oil) is trapped between armature conductor bars and a support member which may be the stator core of a rotating machine or the machine frame. It is intended in accordance with the present teaching to distribute mechanical forces exerted upon the parts of the stator of a rotating electric machine such as the machine shown at 101 in FIG. 1. The machine 101 includes a rotor 1, an armature winding 2 and an stator core 3. There is a narrow gap 4 of width or height h over a substantial part of the outer circumferential surface 2' of the winding 2. A viscous liquid such as transformer oil or the like is disposed within the gap 4. The liquid is supplied under pressure by a mechanism 20 to provide steady-state support of the winding 2, but, in the course of operation of the machine forces of a transient nature of various origins impose pressure changes in the liquid at local locations by virtue of relative motion that changes the gap thickness or height h; that change in gap thickness h, together with the viscosity of the liquid, serves to affect the liquid pressure at the local locations, as now discussed with reference to FIGS. 1–4.

Figure 2:
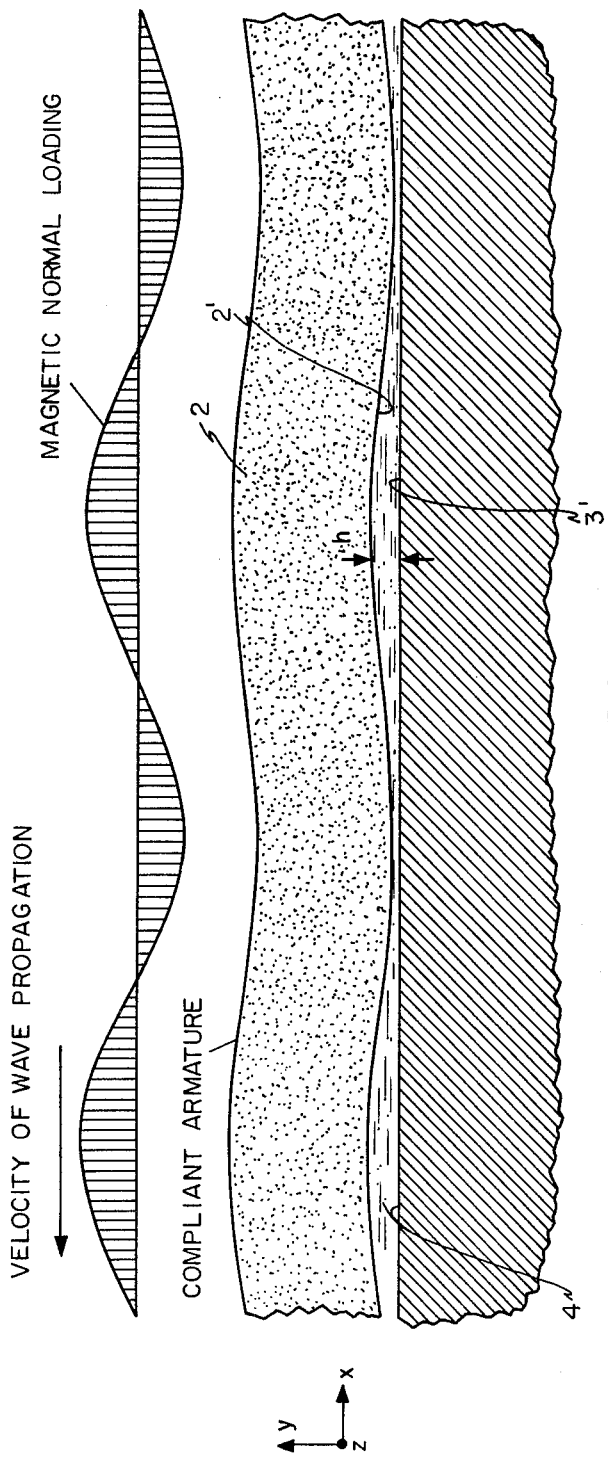
FIG. 2 is a view, on an enlarged scale, of a part of the machine of FIG. 1 to show distortion of that part under loading, together with a graph of one form of such loading, mechanical normal loading.

Basically, a fluid such as oil (see FIG. 2) is trapped between the outer surface 2' of the cylindrical-shaped armature winding structure 2 in FIG. 2 and the inner surface 3' of the cylindrical-shaped magnetic stator core 3. The core 3, of course, is magnetic iron laminates and is quite rigid. (It will be appreciated that the forces on the armature winding 2 could be taken by the stator frame in a different configuration.) The forces on the armature or armature winding 2 of concern here arise from electromagnetic effects in the machine 1, and are radial. (Torsional armature reaction force may be carried conveniently to mechanical ground by means of glass-fiber-reinforced plastic tubes, bound to the inner and outer surfaces of the armature winding.) Large radial forces imposed on the armature 2, which is relatively compliant to ovalizing loads, are carried uniformly to the rigid stator core 3 by means of a pressure rise in the fluid film. The fluid pressure rise, which counters the effect of radial armature electromagnetic loading, arises in the fluid film in response to small armature deflections under the load. The extent of the deflection of the relatively compliant armature is limited to that at which fluid reaction pressure, aided to some degree by armature structural stiffness, balances the ovalizing forces arising from electromagnetic loading. An effective fluid-gap design implies that sufficient restoring pressure will be developed in the film (i.e., the liquid in the gap 4) by an armature deflection that is less than the overall undeflected film thickness; said another way, the pressure in the liquid in the gap 4 must be redistributed to prevent solid contact across the gap caused by transient forces (e.g., said ovalizing) as well as steady-state forces (e.g., gravitational forces on the armature). In FIG. 1 the restoring forces to maintain the gap 4 with a non-zero thickness against the steady-state condition (that is, to support the weight of the winding 2 in FIG. 1 and other long-term forces) is achieved by a liquid stream from the pumping mechanism 20 into fluid inlets 5A-5D and emission from fluid outlets 5A'-5D', the restoring forces being applied at the regions of cavities 4B$_1$-4B$_4$. In this circumstance, any transient decrease in gap thickness h in the regions labeled 4A and 4A', for example, for any reason, will result in a pressure increase at the affected region, as above explained, tending to maintain the gap at its original thickness. Thus, originally, the liquid suspension due to forces at areas 4B$_1$-4B$_4$ will seek an equilibrium to suspend the armature weight. Transients, such as ovalizing, create transient pressure at local locations in the narrow-gap regions (e.g., 4A and 4A') by virtue of relative motion that changes the gap thickness. In accordance with the present teaching, then, the gap 4 is maintained with a thickness h>0 at all times at said local locations and at other locations of the gap 4 during both steady state and transient loadings, as now discussed in greater detail.

In the next few paragraphs, a two-dimensional analysis is performed which relates the fluid pressure in the gap 4 to armature deflection, fluid viscosity and the pertinent gap dimensions. Thus, criteria may be established for the design of fluid gap capable of supporting expected electromagnetic armature loading. The explanation, it should be noted, relates to transient conditions, not long-term loading; for clarity, it is repeated that short-term or transient loads are taken by changes in h whereas long-term loading is counteracted at the regions 4B$_1$-4B$_4$ in FIG. 1.

The electromagnetic, radial armature loading is known to vary sinusoidally in the steady state, being a magnetic "pressure" wave rotating synchronously with the rotor, with a wavelength equal to the pole pitch. For the first order analysis, the armature deflection, in response to the electromagnetic load, is assumed to be sinusoidal (see FIG. 2). Hence, an expression for the fluid gap thickness, which varies in space and time according to the deflection, may be given by:

$$h = g_o + d \sin(p\theta + \omega t), \qquad (1)$$

where
h is the gap height,
$\theta$ is the tangential space coordinate of a point along the gap,
$\omega$ is the rotor synchronous speed,
p is the number of machine poles,
$g_o$ is the undeflected gap thickness, and
d is the magnitude of the deflection.

Figure 3:
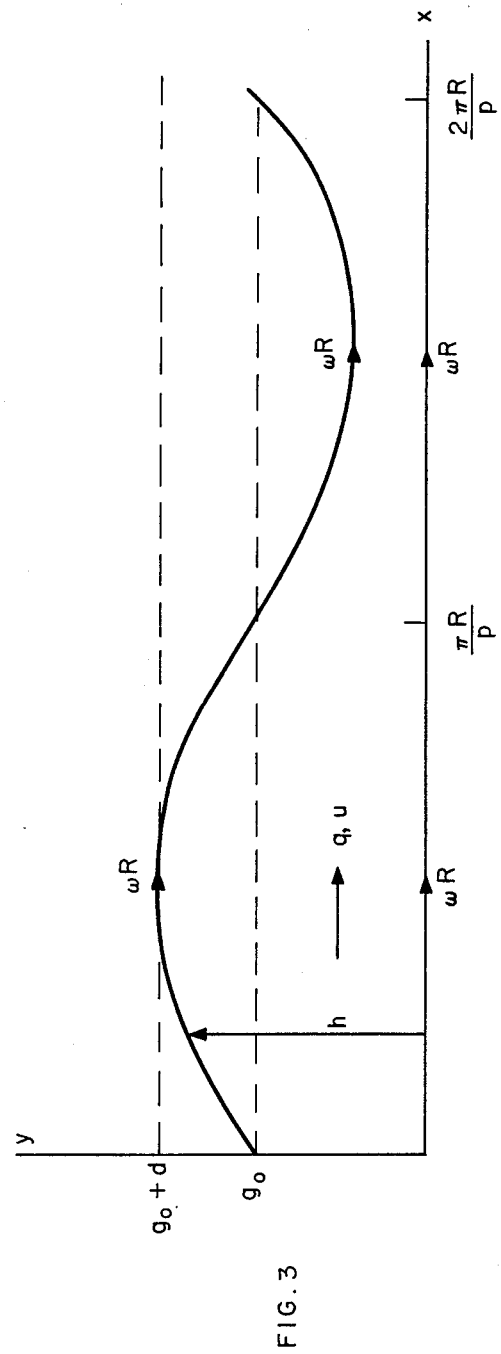
FIG. 3 is a graph of a channel flow model for the structure and loading depicted in FIG. 2.
Figure 4:
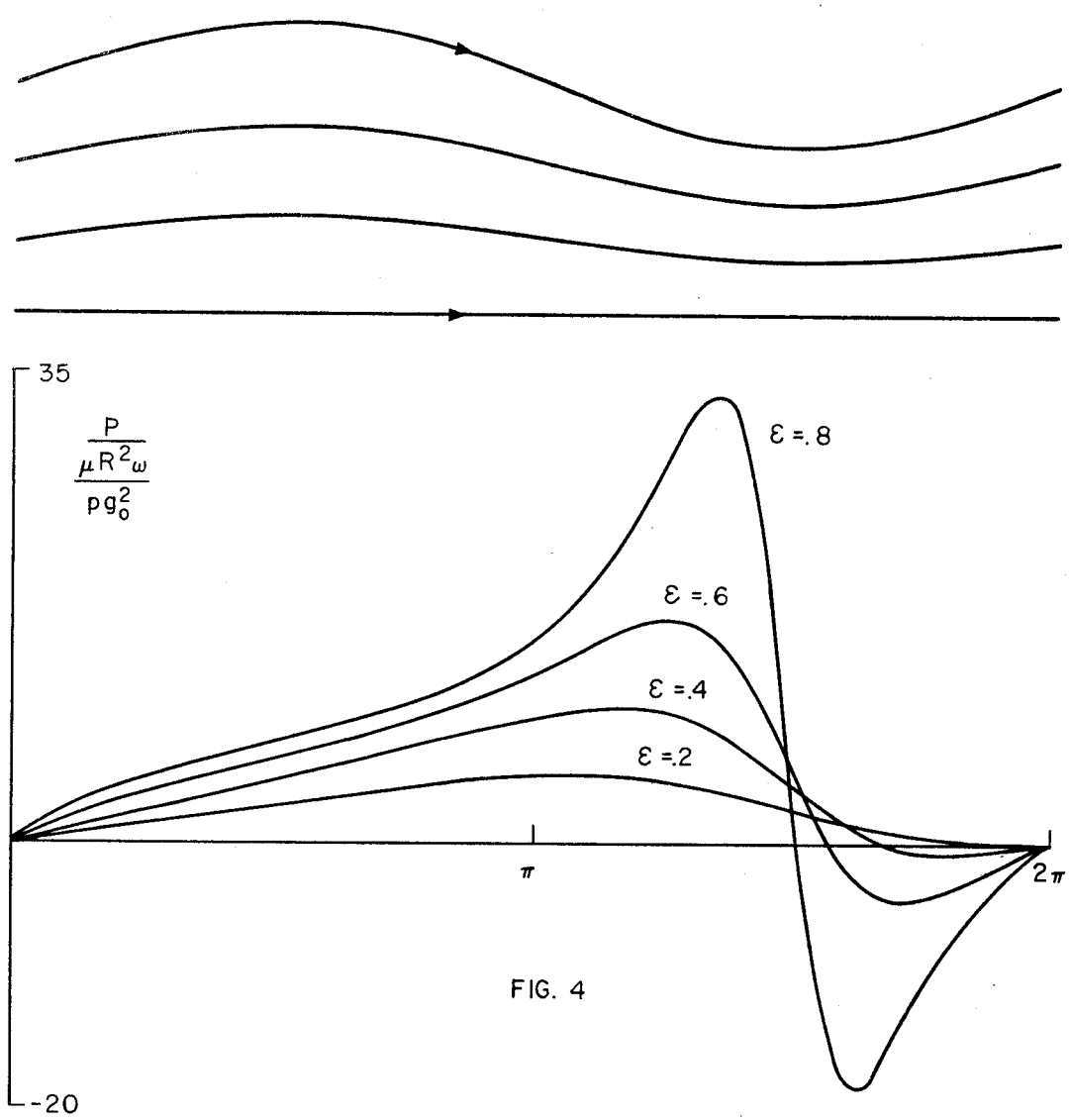
FIG. 4 is a graph showing dimensionless pressure distribution.

The fluid flow produced by these conditions is a peristaltically pumped flow with an associated pressure distribution. Since the gap thickness h and the changes in h are small compared to the wavelength the flow will be dominated by viscous effects, i.e., low Reynolds number. The solution for this flow is readily effected by transforming the analysis to a frame of reference that is traveling with the wave. The channel-flow model viewed from the steady flow wave frame of reference is shown in FIG. 3. In the terms of FIG. 3, the channel height or gap thickness h is $$h = g_o + d \sin\left(\frac{px}{R}\right) = g_o(1 + \epsilon \sin \phi), \qquad (2)$$

where
$\epsilon$ = dimensionless deflection = $d/g_o$,
$\phi$ = dimensionless length = $px/R$, and
$\omega R$ = convecting wall velocity.

The distribution of the fluid flow velocity u in the x direction, across the gap at any $\phi$, is given by $$u = \frac{-p}{2\mu R}(y^2 - hy)\frac{dP}{d\phi} + \omega R, \qquad (3)$$

where $\mu$ is fluid fiscosity, P is fluid pressure. The y component of velocity is at all times negligible. From the above equation for the fluid film velocity and the principle of continuity, it follows that $$q = \int_o^h u\, dy \quad \text{where } q \text{ is the net flow and is independent of } \phi. \qquad (4)$$

This leads to the pressure gradient $$\frac{dP}{d\phi} = \frac{12\mu R}{p}\left(\frac{\omega R}{h^2} - \frac{q}{h^3}\right). \qquad (5)$$

The pressure distribution along the length of the fluid film (i.e., the x direction in FIG. 3), developed in response to the deflection, is then given by $$P(\phi) = \frac{12\mu R}{p}\left(\frac{\omega R}{g_o^2}\int_o^\phi \frac{d\phi}{(1-\epsilon\sin\phi)^2} - \frac{q}{g_o^3}\int_o^\phi \frac{d\phi}{(1-\epsilon\sin\phi)^3}\right) + P(\theta), \qquad (6)$$

where P(O) is an arbitrary constant, determined by the local degree of hydrostatic pressurization. It will be noted that in the transient analysis the steady state flow required for support of static forces has been ignored.

The net flow q (in the wave frame), may be evaluated by requiring the pressure distribution to be periodic, since the gap forms a closed path. This leads to the expression $$q = \omega R \, g_o \frac{\int_o^{2\pi} \frac{d\phi}{(1 - \epsilon\sin\phi)^2}}{\int_o^{2\pi} \frac{d\phi}{(1 - \epsilon\sin\phi)^3}} = 2\omega R g_o \frac{(1 - \epsilon^2)}{2 + \epsilon^2}, \quad (7)$$

and the final dimensionless result $$\frac{P(\phi) \, p \, g_o^2}{\mu R^2 \omega} = \quad (8)$$

$$12 \left[ \int_o^\phi \frac{d\phi}{(1 - \epsilon\sin\phi)^2} - \frac{2(1 - \epsilon^2)}{(2 + \epsilon^2)} \int_o^\phi \frac{d\phi}{(1 - \epsilon\sin\phi)^3} \right].$$

In the equation 8, P(O) in (equation 6) has been taken to be zero; the intregals are evaluated explicitly in said report IR2. The results of the analysis, plotted in dimensionless form (see FIG. 4), indicate that very high pressure differences may be developed in this manner, particularly at the leading edge of the necking region. Negative pressures are predicted at the mouth of the neck, tending to close the gap; however, negative pressure will not occur due to cavitation in the fluid. Also, the gap may be externally pre-pressurized to prevent negative pressure and cavitation.

A typical value for the scale factor for the transient pressure $P(\phi)$ in equation (8) is $$\frac{\mu \omega R^2}{p \, g_o^2} = \frac{(1.45 \, 10^{-6} \text{ psi-seconds}) \left[ \frac{377}{\text{sec}} \right] (20 \text{ in})^2}{(2) (0.030 \text{ in})^2} \approx 121.5 \text{ psi}, \quad (9)$$

for the dimensions of a machine discussed in said report IR2 with a 0.030 in. gap and with the viscosity of the oil in the gap selected the same as that of transformer oil. Typical electromagnetic loadings are on the order of 100 psi in the steady state, and several times that during fault conditions. The stiffness (load/deflection) factor of merit of a design will be decreased somewhat since the actual deflections will not be sinusoidal as assumed for this first order analysis. End seal losses may necessitate further derating of the support.

The armature winding 2 in FIG. 1 may be the toroidal winding disclosed in U.S. Pat. Nos. 4,087,711 or the distributed gradient winding of 3,743,875, for example. Either such winding, as is known, is composed, in large machines, of copper bars insulated from one another by paper or the like and formed into a unitary structure by an adhesive binder and fiber-glass cords. Hence, while the winding has some rigidity, it is subject to distortion under the influence of the forces discussed herein. The winding 2 is composed of two windings $2_1$ and $2_2$ separated by a cylindrical insulator 6. The frame of the machine 101 is marked 8 which is intended to designate all the outer frame structure. The pressure of the liquid in the gap 4 is established and maintained by the liquid pumping mechanism 20 which fills the space in the gap; the unit 20 may be similar to that mechanism which is used to pump lubricant into externally pressurized journal bearings. The pressure thus established should be adequate to assure that the gap thickness h does not go to zero under transient conditions and sufficiently high to assure an adequate supply. The above discussion concerns one specialized form that the armature winding can take. More conventional winding types are discussed below. Such windings types pose problems not found in the embodiment of FIG. 1, but the fluid support ideas disclosed here have use with respect to those more conventional winding types.

Figure 5:
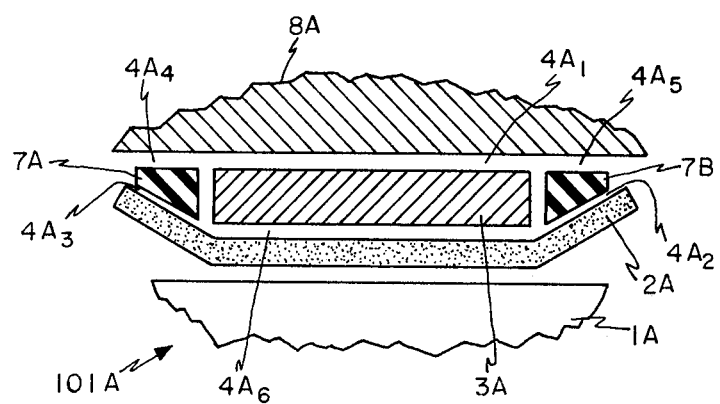
FIG. 5 is a partial side view, partly in section and diagrammatic in form, of a modification of the rotor of FIG. 1.

In FIG. 5, fluid is employed to support machine elements in addition to the winding designated 2A of a rotating electric machine 101A. In FIG. 5, the labels $4A_1$-$4A_6$ designate gaps which contain liquid to support a machine core 3A, end supports 7A and 7B (which are annular insulators and structural supports) and the winding 2A, the ultimate support member being the frame shown at 8A. The machine 101A has a rotor 1A. Appropriate shaping of the fluid inlets and cavities provide steady state support. Again, the gap thickness h, its width and length and the viscosity of the liquid therein are appropriately interrelated so that transient loading can be accommodated. The forces in the machine 101A are from the winding 2A to the end supports 7A and 7B and the core 3A, thence to the frame 8A. The scheme shown can be employed, by way of illustration, for supporting purposes when the core 3A is segmented (see U.S. Pat. No. 3,999,093). The winding, in this situation, may be that shown in said Pat. Nos. 4,087,711 or 3,743,875, but others may be used.

While the present fluid support scheme is discussed mostly in the context of diffusing forces on the armature winding of a rotating electric machine to provide distributed support thereof, the ideas disclosed can be used, as indicated above, to support other machine parts. Thus, rather than (or in addition to) supporting the complete armature winding, in some circumstances it may be advantageous to use liquid suspension of individual winding bars; for example, there are shown in FIGS. 6-12 a number of ways that such suspension can be employed to advantage. In all these figures, the elements are shown schematically; crosshatching is not used in all cases where ordinarily it would be.

Figure 6:
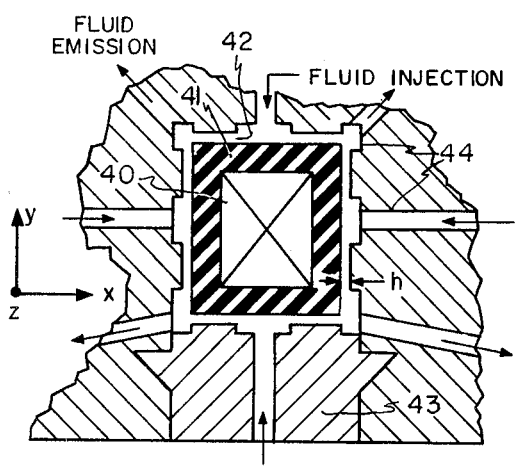
FIGS. 6–10 are schematic partial cross-sectional view showing various liquid support arrangements in accordance with the present teachings.

In FIG. 6, a conductor bar 40 (whose axial dimension is in the Z-direction is surrounded by an insulator 41 which, in turn, is bounded over a substantial part of its surface by a narrow gap 42. The narrow gap 42 has a thickness that is again labeled h and it bounds the conductor bar 40 over the whole axial length (i.e., the Z-direction dimension of the conductor 40) of the conductor bar. A slot wedge 43 maintains the bar in the slot shown at 44.

Figure 7:
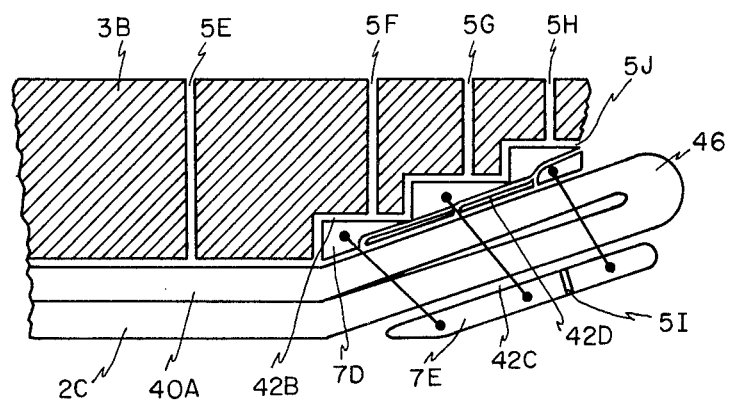

The side-view representation of FIG. 7 shows a stator core 3B with liquid inlets 5E-5H to gap 42B between the core 3B and end turns 46 and main conductor bars 40A of an armature winding 2C. Structural supports 7D and 7E are provided with narrow gaps 42C and 42D, respectively, between the supports and the end turns 46. Fluid inlets to the narrow gaps 42C and 42D are provided at 5I and 5J, respectively. Fluid outlets (like outlets 5A' to 5D' in FIG. 1) are not shown in FIG. 7, or later figures.

Figure 8:
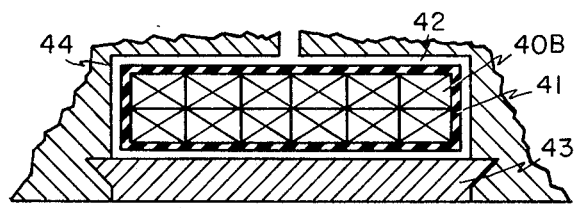

The representation in FIG. 8 is like that of FIG. 6, except that conductor 40B in FIG. 8 is a multiple-bar conductor.

Figure 9:
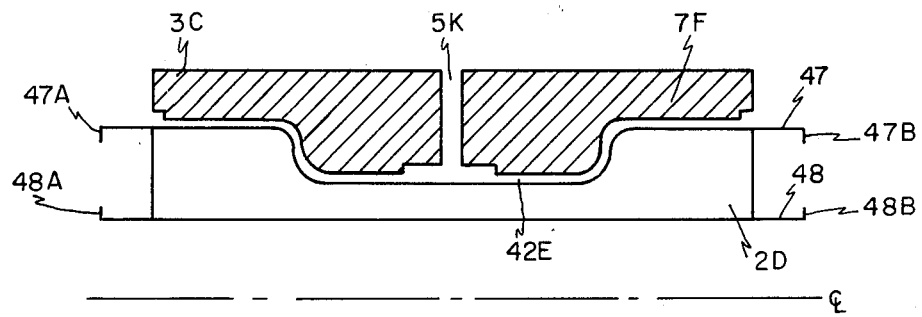
Figure 10:
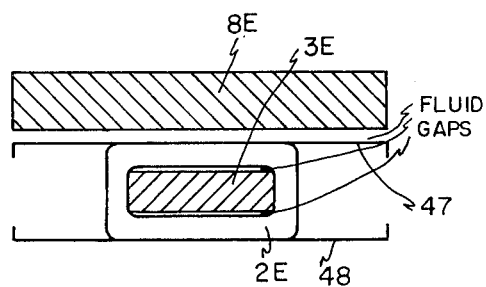

In FIG. 9, there is shown a stator core 3C with an inlet 5K to narrow gap 42E between the core 3C and an armature winding 2D. The illustration in FIG. 9 contains an outer torque tube 47 having flanges 47A and 47B and an inner torque tube 48 having flanges 48A and 48B, FIG. 10 shows a toroidal armature winding 2E wrapped around a stator core 3E (which may be segmented as in U.S. Pat. No. 3,999,093). The combination of the winding and stator core is supported by layers of fluid, as indicated. Outer and inner torque tubes are again designated 47 and 48 as in FIG. 9.

The fluid support described here is particularly useful to withstand radial forces, but it can be used, as well, for forces in the azimuthal and axial directions. The suspension system described has a number of advantages. It distributes forces in a very uniform manner: any force on the conductor is translated into pressure, thereby largely eliminating force concentrations. Stress on the bar insulation of the machine is largely reduced; in particular, if the bar insulation is properly selected so that the supporting fluid can fill substantially all the pores, bar force taken in compression of the fluid will put very little stress on the bar insulation. The support system allows, automatically, for thermal expansion and contraction. By proper sizing of the narrow gaps, fluid inlets and other flow paths, damping of vibration can be achieved. The system can be employed to augment other types of bar support; for example, the supporting fluid can be trapped or injected between a filament-wound torque tube and a back-up cylinder, the fluid serving to give radial support while the torque tube gives torsional support.

The fluid support system disclosed here can be used for all types of armature windings; bar-in-slot types, multiple bar-in-single-slot types, completely air gap or monolithic armatures, and so forth. Further, as indicated, the fluid support need not be restricted to conductors or to the armature winding.

Further modifications of the invention herein disclosed will occur to persons skilled in the art and all such modifications are deemed to be within the spirit and scope of the invention as defined by the appended claims.

What is claimed is:

1. A rotating electric machine comprising, in combination: a rotor and a stator mounted for relative rotation therebetween, said stator comprising an armature winding, a stator core, and a frame adapted for supporting said stator core, there being a narrow gap of thickness h between at least portions of the armature winding and the stucture of the stator adjacent thereto, a viscous liquid disposed in said gap, the narrow gap of the thickness h extending over a substantial part of the winding surface; and means to pressurize the liquid within the narrow gap, said liquid being further pressurized at local locations by virtue of relative motion that changes the gap thickness h, said pressurized liquid together with the viscosity of the liquid adapted to support said armature winding with respect to said structure adjacent thereto, said gap being maintained by the liquid with a thickness h>0 at all times at said local locations and at other locations during transient and steady-state loading.

2. A rotating electric machine as claimed in claim 1 having winding structural elements incorporated as part of the supported winding and wherein the gap is between the winding structural elements and the structure of the stator adjacent thereto.

3. A rotating electric machine as claimed in claim 1 in which the means to pressure comprises pump means, inlet means to the narrow gap and outlet means therefrom, there being a flow of the viscous liquid into and out of the gap, the flowing liquid serving, among other things, to support the armature and provide a restoring force against long-term forces, the transient forces being counteracted within the narrow gap.

4. A rotating electric machine as claimed in claim 1 in which the armature winding comprises bars contained in slots in ferromagnetic stator iron, the viscous liquid being disposed in gap extending substantially all around the bar.

5. A rotating electric machine as claimed in claim 4 in which there is only one armature bar per slot.

6. A rotating electric machine as claimed in claim 4 in which there is more than one armature bar per slot.

7. A rotating electric machine as claimed in claim 4 in which the viscous liquid is contained in more than one liquid layer.

8. A rotating electric machine as claimed in claim 1 in which the armature winding has an outer surface which is substantially cylindrical, and incorporates a tubular structural support adapted for carrying torsional forces.

9. A rotating electric machine as claimed in claim 8 in which a ferromagnetic stator core is disposed immediately outside of the viscous-fluid filled gap.

10. A rotating electric machine as claimed in claim 8 in which a cylindrical layer of insulation is disposed around the outside of the armature.

11. A rotating electric machine as claimed in claim 1 in which a viscous liquid filled gap is disposed between the stator core and the machine frame.

12. A rotating electric machine comprising, in combination, a rotor and a stator mounted for relative rotation therebetween, said stator comprising an armature winding, a stator core, and a frame, the armature winding having a straight section in which the conductors are disposed parallel to the axis of the machine and an end-turn region in which the conductors are disposed in a helical or involute pattern, the conductors also being attached to support structure in the end winding regions, the support structure containing a substantially cylindrical outer surface, the stator core and/or machine frame also containing a substantially cylindrical inner surface, the two surfaces forming a narrow gap, a viscous fluid being disposed within said gap and pressurized by external means, said pressurized viscous fluid serving to support said support structure with respect to said stator core and/or said machine frame.

13. A rotating electric machine that comprises, in combination: a rotor and a stator mounted for relative rotation therebetween, said stator comprising an armature winding and a stator core, there being a narrow gap between at least portions of the armature winding and other stator elements to receive a viscous liquid under pressure adapted to support said armature winding within said stator core, said gap having length and width dimensions that are much larger than the thickness dimension thereof, the viscosity of the liquid and the gap dimensions being interrelated to ensure further pressurization of the fluid occasioned by relative movement between the armature winding and said other stator elements to effect distribution of mechanical forces therebetween without solid contact across that gap.

14. A rotating electric machine that comprises, in combination: a rotor and a stator mounted for relative rotation therebetween, said stator comprising an armature winding and a stator core, there being a narrow gap between at least portions of the armature winding and other stator elements to receive fluid means under pressure adapted to support said armature winding within said stator core, the dimensions of the gap being interrelated to the fluid means to ensure further pressurization of the fluid means occasioned by relative movement between the armature winding and said other stator elements to effect even distribution of mechanical forces therebetween, said fluid means in combination with the narrow gap being operative to maintain a gap thickness greater than the gap during transient loading of the armature winding and being operative as well to provide restoring and stabilizing forces with respect to longtime loading of the armature winding.

* * * * *